United States Patent
Sahara (10) Patent No.: US 9,214,994 B2
(45) Date of Patent: Dec. 15, 2015

(54) WIRELESS COMMUNICATION SYSTEM AND WIRELESS COMMUNICATION METHOD

(71) Applicant: KYOCERA CORPORATION, Kyoto (JP)

(72) Inventor: Toru Sahara, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/498,949

(22) Filed: Sep. 26, 2014

(65) Prior Publication Data

US 2015/0016559 A1     Jan. 15, 2015

Related U.S. Application Data

(63) Continuation of application No. 13/498,855, filed as application No. PCT/JP2010/066307 on Sep. 21, 2010.

(30) Foreign Application Priority Data

Sep. 28, 2009   (JP) ................. 2009-223342

(51) Int. Cl.
   *H04B 7/02* (2006.01)
   *H04B 7/04* (2006.01)
   *H04B 7/06* (2006.01)

(52) U.S. Cl.
   CPC ............ *H04B 7/0456* (2013.01); *H04B 7/0413* (2013.01); *H04B 7/0669* (2013.01)

(58) Field of Classification Search
   CPC ....... H04B 7/0669; H04B 7/02; H04L 1/0618
   USPC .................... 375/267, 260, 259, 203
   See application file for complete search history.

(56) References Cited

U.S. PATENT DOCUMENTS

| | | |
|---|---|---|
| 2002/0028694 A1 | 3/2002 | Doi |
| 2005/0129137 A1* | 6/2005 | Yamada et al. ............... 375/267 |

(Continued)

FOREIGN PATENT DOCUMENTS

| | | |
|---|---|---|
| CN | 1452819 A | 10/2003 |
| CN | 1914841 A | 2/2007 |

(Continued)

OTHER PUBLICATIONS

International Search Report; PCT/JP2010/066307; Dec. 28, 2010.

(Continued)

*Primary Examiner* — Zewdu Kassa
(74) *Attorney, Agent, or Firm* — Studebaker & Brackett PC (57) ABSTRACT

A base station includes: a MIMO precoding section (32) for converting transmission data addressed to a mobile station to two data streams that respectively correspond to two reception antennas included in the mobile station, by performing MIMO precoding on the transmission data; a weight calculating section for calculating a transmission weight to be used for forming a directivity pattern directed toward each of the two reception antennas; and a weighting/combining section (34) for generating two combined data streams that are to be supplied to the respective antennas (20-1 and 20-2), by weighting each of the two data streams with the transmission weight calculated with respect to the reception antenna of the mobile station that corresponds to the data stream, and combining the two weighted data streams for each of the antennas (20). The two combined data streams are respectively transmitted from the antennas (20-1 and 20-2).

3 Claims, 9 Drawing Sheets

(56) References Cited

U.S. PATENT DOCUMENTS

| | | | |
|---|---|---|---|
| 2005/0265470 A1 | 12/2005 | Kishigami et al. | |
| 2005/0286484 A1 | 12/2005 | Nakao et al. | |
| 2006/0258303 A1 | 11/2006 | Taira et al. | |
| 2007/0104165 A1* | 5/2007 | Hanaoka et al. | 370/338 |
| 2007/0159393 A1 | 7/2007 | Imai | |
| 2008/0285524 A1* | 11/2008 | Yokoyama | 370/336 |
| 2009/0093222 A1 | 4/2009 | Sarkar | |
| 2009/0154585 A1 | 6/2009 | Lee et al. | |
| 2009/0196365 A1 | 8/2009 | Takano | |
| 2009/0239565 A1 | 9/2009 | Han et al. | |
| 2009/0285325 A1 | 11/2009 | Zhou | |
| 2010/0246379 A1 | 9/2010 | Nakao et al. | |
| 2011/0019573 A1* | 1/2011 | Ezri | 370/252 |
| 2013/0022159 A1 | 1/2013 | Nakao et al. | |

FOREIGN PATENT DOCUMENTS

| | | |
|---|---|---|
| CN | 1977484 A | 6/2007 |
| CN | 101536389 A | 9/2009 |
| JP | 2008-177938 A | 7/2008 |
| JP | 2008-206508 A | 9/2008 |
| JP | 2009-207179 A | 9/2009 |
| WO | 2004/095730 A1 | 11/2004 |
| WO | 2009/046318 A2 | 4/2009 |

OTHER PUBLICATIONS

Written Opinion of the International Searching Authority; PCT/JP2010/066307; Dec. 28, 2010.

T.Shono; "WiMAX Textbook"; Jul. 2008; pp. 145-154.

Y. Takatori et al.; "Downlink Beamforming Method for SDMA Smart Antennas: Transmission Preformance for the Angular Spread"; IEICE Technical Report, Antennas and Propagation; Oct. 12, 2001; RCS2001-108, vol. 101, No. 367; pp. 123-128.

Y. Takatori et al.; "Downlink Beamforming Method for SDMAN Smart Antennas in Multipath Fading Environments"; IEICE Technical Report; Feb. 28, 2002; RCS2001-305, vol. 101, No. 686; pp. 145-150.

Japanese Office Action; "Notice of Reasons for Rejection," issued by the Japanese Patent Office on Mar. 25, 2014, which corresponds to Japanese Patent Application No. 2009-223342; with English language statement of relevance.

Chinese Office Action; issued Mar. 19, 2014, which corresponds to Chinese Patent Application No. 201080043338.5 ; with English language concise explanation.

An Office Action; "Notice of Reasons for Rejection," issued by the Japanese Patent Office on Mar. 10, 2015, which corresponds to Japanese Patent Application No. 2014-135839 and is related to U.S. Appl. No. 14/498,949; with English language concise explanation.

* cited by examiner

| MULTI-ANTENNA TECHNOLOGY | RECEPTION CHARACTERISTIC | |
|---|---|---|
| | WHEN THERE IS LITTLE PROPAGATION PATH FLUCTUATION | WHEN THERE IS LARGE PROPAGATION PATH FLUCTUATION |
| MIMO SCHEME | ○ (MIMO RECEPTION COMBINED GAIN) | ○ (MIMO RECEPTION COMBINED GAIN) |
| SCHEME ACCORDING TO THE EMBODIMENT | ◎ (BEAMFORMING GAIN) | ○ (MIMO RECEPTION COMBINED GAIN) |

WIRELESS COMMUNICATION SYSTEM AND WIRELESS COMMUNICATION METHOD

TECHNICAL FIELD

The present invention relates to a wireless communication system and a wireless communication method, and more particularly, to improvement for a multiple-input multiple-output (MIMO) scheme.

BACKGROUND ART

In recent years, various kinds of MIMO schemes have been adopted to an increasing number of wireless communication systems. For example, Worldwide Interoperability for Microwave Access (WiMAX) adopts a space-time block coding (STBC) scheme, which is robust against propagation path fluctuation, or a spatial multiplexing (SM) scheme, which provides high throughput (for example, see Non Patent Literature 1).

PRIOR ART DOCUMENT

Non-Patent Document

[NPL1] Takashi Shono, "Wimax Textbook", Impress R&D, July 2008, p. 145, p. 154

DISCLOSURE OF THE INVENTION

Problems to be Solved by the Invention

The wireless communication systems that adopt the MIMO scheme require further improvement in reception characteristic.

The present invention has been made in view of the above-mentioned problem, and thus has an object to provide a wireless communication system and a wireless communication method which are capable of enhancing a MIMO reception characteristic.

Means for Solving the Problems

In order to solve the above-mentioned problem, according to the present invention, there is provided a wireless communication system, including: a transmission device including a plurality of transmission antennas; and a MIMO reception device including a plurality of reception antennas, the transmission device including: MIMO precoding means for converting transmission data addressed to the MIMO reception device to a plurality of data streams that respectively correspond to the plurality of reception antennas, by performing predetermined MIMO precoding on the transmission data; weight calculating means for calculating a transmission weight with respect to each of the plurality of reception antennas so that the plurality of transmission antennas form a directivity pattern directed toward the each of the plurality of reception antennas; weighting/combining means for generating a plurality of combined data streams that are to be supplied respectively to the plurality of transmission antennas, by weighting each of the plurality of data streams with the transmission weight calculated with respect to the reception antenna that corresponds to the each of the plurality of data streams, and combining the plurality of weighted data streams for each of the plurality of transmission antennas; and means for respectively transmitting the plurality of combined data streams from the plurality of transmission antennas, and the MIMO reception device including: means for receiving, by the plurality of reception antennas, the plurality of combined data streams respectively transmitted from the plurality of transmission antennas; and MIMO decoding means for acquiring the transmission data by performing MIMO decoding that corresponds to the predetermined MIMO precoding on the plurality of combined data streams received by the plurality of reception antennas.

According to the present invention, the transmission device converts the transmission data addressed to the MIMO reception device to the plurality of data streams through the MIMO precoding, and then transmits each of the plurality of data streams with the directivity pattern directed toward the reception antenna corresponding to the data stream in question. Therefore, when there is little fluctuation in the radio propagation path that exists between the transmission device and the MIMO reception device, it is easy to obtain a beamforming gain due to the directivity pattern formed by the transmission device. The beamforming gain exceeds a MIMO reception combined gain that is obtained through the conventional MIMO scheme in which the transmission is non-directional. On the other hand, when there is large fluctuation in the radio propagation path, it is difficult to obtain the beamforming gain due to distortion of the directivity pattern. Instead, however, the MIMO reception combined gain that equals to that of the conventional MIMO scheme can be obtained. In other words, according to the present invention, particularly when there is little fluctuation in the radio propagation path that exists between the transmission device and the MIMO reception device, it is possible to enhance the MIMO reception characteristic.

Further, according to an aspect of the present invention, the MIMO reception device may further include means for respectively transmitting a plurality of known reference symbols having a low correlation thereamong from the plurality of reception antennas at the same frequency and at the same timing, the transmission device may further include means for receiving, by the plurality of transmission antennas, the plurality of known reference symbols respectively transmitted from the plurality of reception antennas, and the weight calculating means may calculate, based on the plurality of known reference symbols received by the plurality of transmission antennas, the transmission weight for forming the directivity pattern in which, with respect to the each of the plurality of reception antennas, a main beam is directed toward the each of the plurality of reception antennas and a null is directed toward the reception antenna other than the each of the plurality of reception antennas.

According to this aspect, a further higher beamforming gain can be obtained, and hence it is possible to further enhance the reception characteristic of the MIMO scheme.

Further, according to an aspect of the present invention, the plurality of data streams may each contain a known control symbol, the MIMO reception device may further include propagation path characteristic estimating means for estimating a characteristic of a radio propagation path that exists between the transmission device and the MIMO reception device based on the plurality of combined data streams received by the plurality of reception antennas and the known control symbols, and the MIMO decoding means may perform the MIMO decoding based on the characteristic of the radio propagation path, which is estimated by the propagation path characteristic estimating means.

Further, according to an aspect of the present invention, the predetermined MIMO precoding may include MIMO precoding of an STBC scheme or an SM scheme.

According to this aspect, the reception characteristic of the STBC-MIMO scheme or the SM-MIMO scheme can be enhanced.

Further, according to the present invention, there is also provided a transmission device including a plurality of transmission antennas, including: MIMO precoding means for converting transmission data addressed to a MIMO reception device to a plurality of data streams that respectively correspond to a plurality of reception antennas included in the MIMO reception device, by performing predetermined MIMO precoding on the transmission data; weight calculating means for calculating a transmission weight so that the plurality of transmission antennas form, with respect to each of the plurality of reception antennas, a directivity pattern directed toward the each of the plurality of reception antennas; weighting/combining means for generating a plurality of combined data streams that are to be supplied respectively to the plurality of transmission antennas, by weighting each of the plurality of data streams with the transmission weight calculated with respect to the reception antenna that corresponds to the each of the plurality of data streams, and combining the plurality of weighted data streams for each of the plurality of transmission antennas; and means for respectively transmitting the plurality of combined data streams from the plurality of transmission antennas.

Further, according to the present invention, there is also provided a wireless communication method for a wireless communication system, the wireless communication system including: a transmission device including a plurality of transmission antennas; and a MIMO reception device including a plurality of reception antennas, the wireless communication method including: converting, by the transmission device, transmission data addressed to the MIMO reception device to a plurality of data streams that respectively correspond to the plurality of reception antennas, by performing predetermined MIMO precoding on the transmission data; calculating, by the transmission device, a transmission weight so that the plurality of transmission antennas form, with respect to each of the plurality of reception antennas, a directivity pattern directed toward the each of the plurality of reception antennas; generating, by the transmission device, a plurality of combined data streams that are to be supplied respectively to the plurality of transmission antennas, by weighting each of the plurality of data streams with the transmission weight calculated with respect to the reception antenna that corresponds to the each of the plurality of data streams, and combining the plurality of weighted data streams for each of the plurality of transmission antennas; respectively transmitting, by the transmission device, the plurality of combined data streams from the plurality of transmission antennas; receiving, by the plurality of reception antennas of the MIMO reception device, the plurality of combined data streams respectively transmitted from the plurality of transmission antennas; and acquiring, by the MIMO reception device, the transmission data by performing MIMO decoding that corresponds to the predetermined MIMO precoding on the plurality of combined data streams received by the plurality of reception antennas.

DESCRIPTION OF EMBODIMENTS

Hereinbelow, detailed description is given of an embodiment of the present invention with reference to the drawings.

Figure 1:
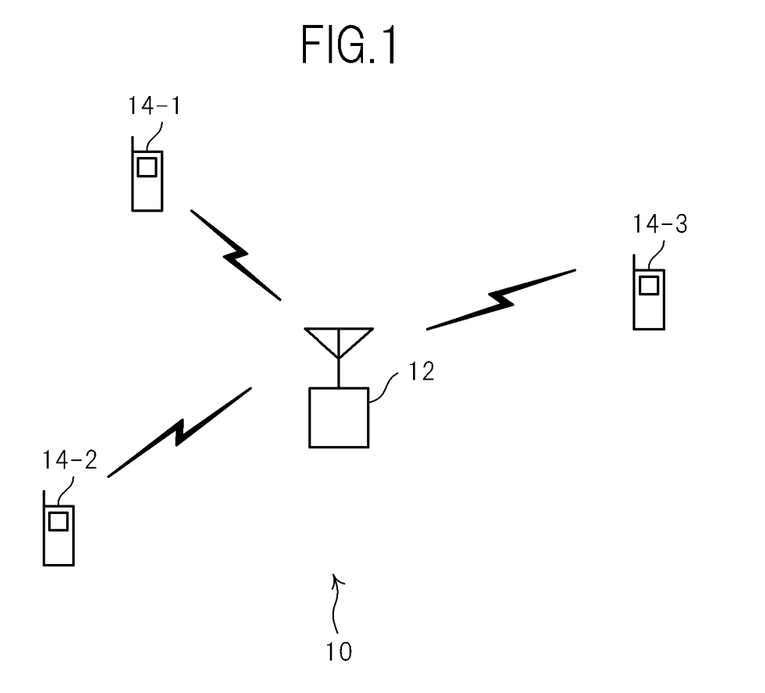
[FIG. 1] A diagram illustrating a configuration of a wireless communication system according to an embodiment of the present invention.

FIG. 1 is a diagram illustrating a configuration of a wireless communication system 10 according to the embodiment of the present invention. As illustrated in FIG. 1, the wireless communication system 10 includes a base station 12 and a plurality of mobile stations 14 (in this example, only mobile stations 14-1 to 14-3 are illustrated).

The base station 12 performs multiplex communication to/from a plurality of mobile stations 14 by using the orthogonal frequency division multiple access (OFDMA) scheme and the time division multiple access/time division duplex (TDMA/TDD) scheme.

Figure 2:
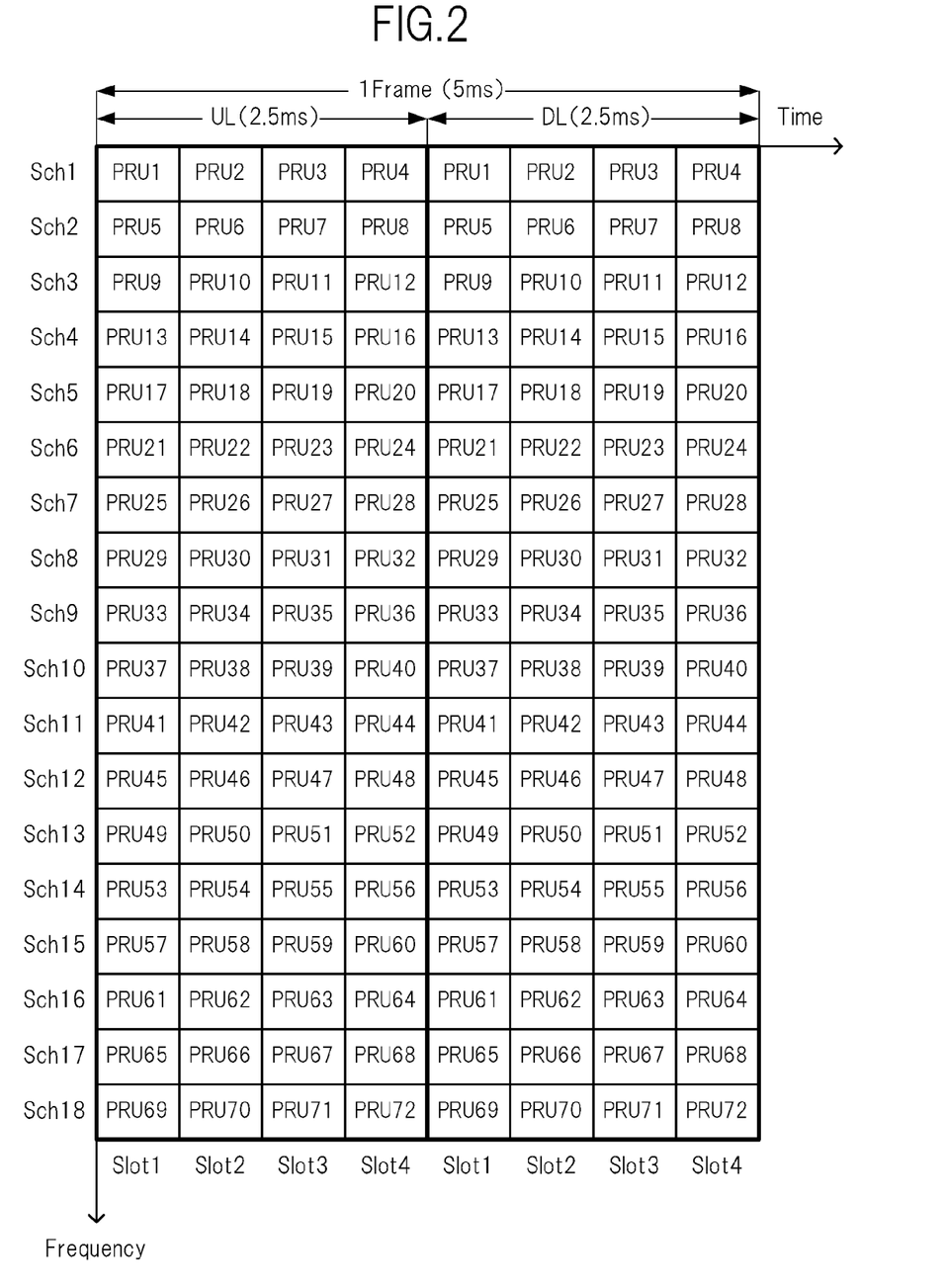
[FIG. 2] A diagram illustrating a radio channel configuration of the wireless communication system according to the embodiment.

FIG. 2 is a diagram illustrating a radio channel configuration of the wireless communication system 10. As illustrated in the figure, in the wireless communication system 10, a TDMA frame, which is a predetermined time duration (in this example, 5 ms), is divided into an uplink subframe (2.5 ms) and a downlink subframe (2.5 ms). Each of the subframes is further divided uniformly into a plurality of time slots (in this example, Slot1 to Slot4). Further, a plurality of OFDMA subchannels (in this example, Sch1 to Sch18) are defined in a predetermined frequency band. A minimum unit of a radio channel to be allocated to the mobile station 14 by the base station 12 is referred to as a physical resource unit (PRU). Each PRU belongs to any one of the time slots (Slot1 to Slot4) and any one of the subchannels (Sch1 to Sch18).

Further, the base station 12 and the mobile station 14 each include a plurality of antennas, and are capable of performing high-speed communication by using a MIMO scheme (such as STBC-MIMO scheme or SM-MIMO scheme) which performs MIMO precoding on transmission data.

Figure 3A:
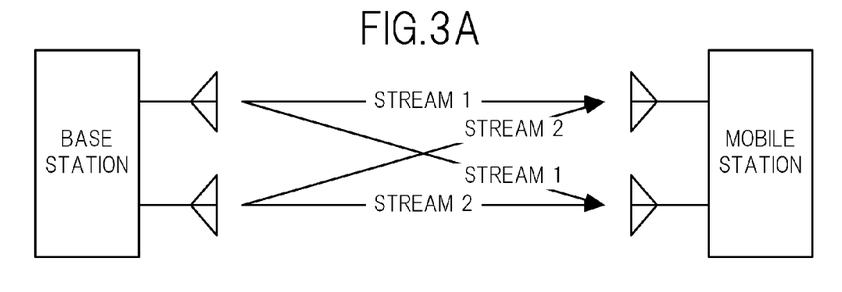
[FIG. 3A] A diagram illustrating propagation paths of data streams in a conventional MIMO scheme.

In the conventional MIMO scheme, the base station (MIMO transmission device) converts transmission data addressed to the mobile station (MIMO reception device) to a plurality of data streams through the MIMO precoding, and then transmits the plurality of data streams from a plurality of transmission antennas, respectively (see FIG. 3A). Then, the mobile station receives, with a plurality of reception antennas, multiple signals each containing a plurality of overlapped data streams transmitted from the respective transmission antennas of the base station. The mobile station performs MIMO decoding on the received multiple signals, to thereby acquire the transmission data.

Figure 3B:
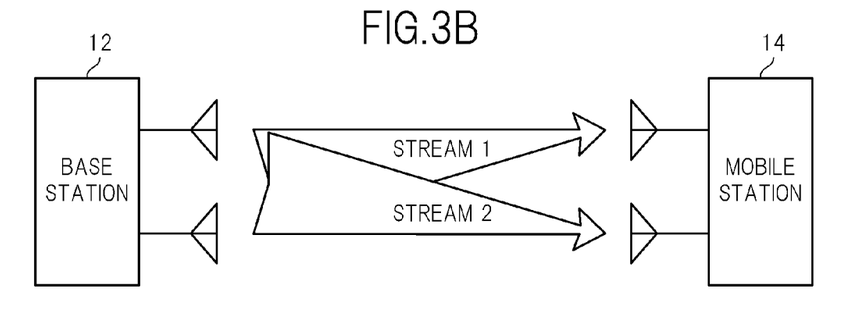
[FIG. 3B] A diagram illustrating propagation paths of data streams according to the embodiment.

On the other hand, in the wireless communication system 10, the base station 12 (transmission device) converts transmission data addressed to the mobile station 14 (MIMO reception device) to a plurality of data streams through the MIMO precoding, and then performs space division multiplexing transmission by using a directivity pattern in which each of the plurality of data streams is directed toward the corresponding reception antennas of the mobile station 14 (see FIG. 3B). Then, the mobile station 14 receives each of the plurality of data streams transmitted from the base station 12 with the reception antenna for the corresponding data stream. The mobile station 14 performs the MIMO decoding on the received data streams, to thereby acquire the transmission data.

Figure 4:
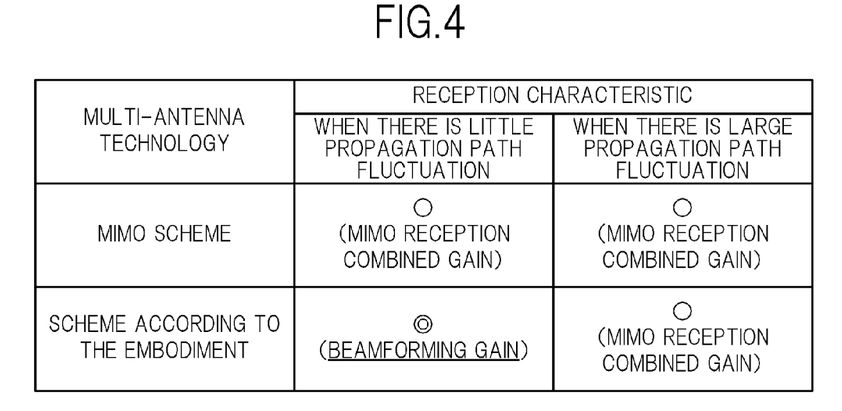
[FIG. 4] A diagram illustrating a reception characteristic of the conventional MIMO scheme and a reception characteristic according to the embodiment.

Thus, with the wireless communication system 10, when there is little fluctuation in a radio propagation path that exists between the base station 12 and the mobile station 14, it is easy to obtain a beamforming gain due to the directivity pattern of the space division multiplexing which is formed by the base station 12. The beamforming gain exceeds a MIMO reception combined gain that is obtained through the conventional MIMO scheme in which the transmission is non-directional. Further, it is also possible to suppress interference by null steering. On the other hand, when there is large fluctuation in the radio propagation path, it is difficult to obtain the beamforming gain due to distortion of the directivity pattern of the space division multiplexing. Instead, however, the MIMO reception combined gain that equals to that of the conventional MIMO scheme can be obtained. In other words, according to the wireless communication system 10, as illustrated in FIG. 4, particularly when there is little fluctuation in the radio propagation path that exists between the base station 12 and the mobile station 14, it is possible to enhance a MIMO reception characteristic in the mobile station 14.

Hereinbelow, specific description is given of configurations that are respectively provided to the base station 12 and the mobile station 14 to implement the above-mentioned processing.

Figure 5:
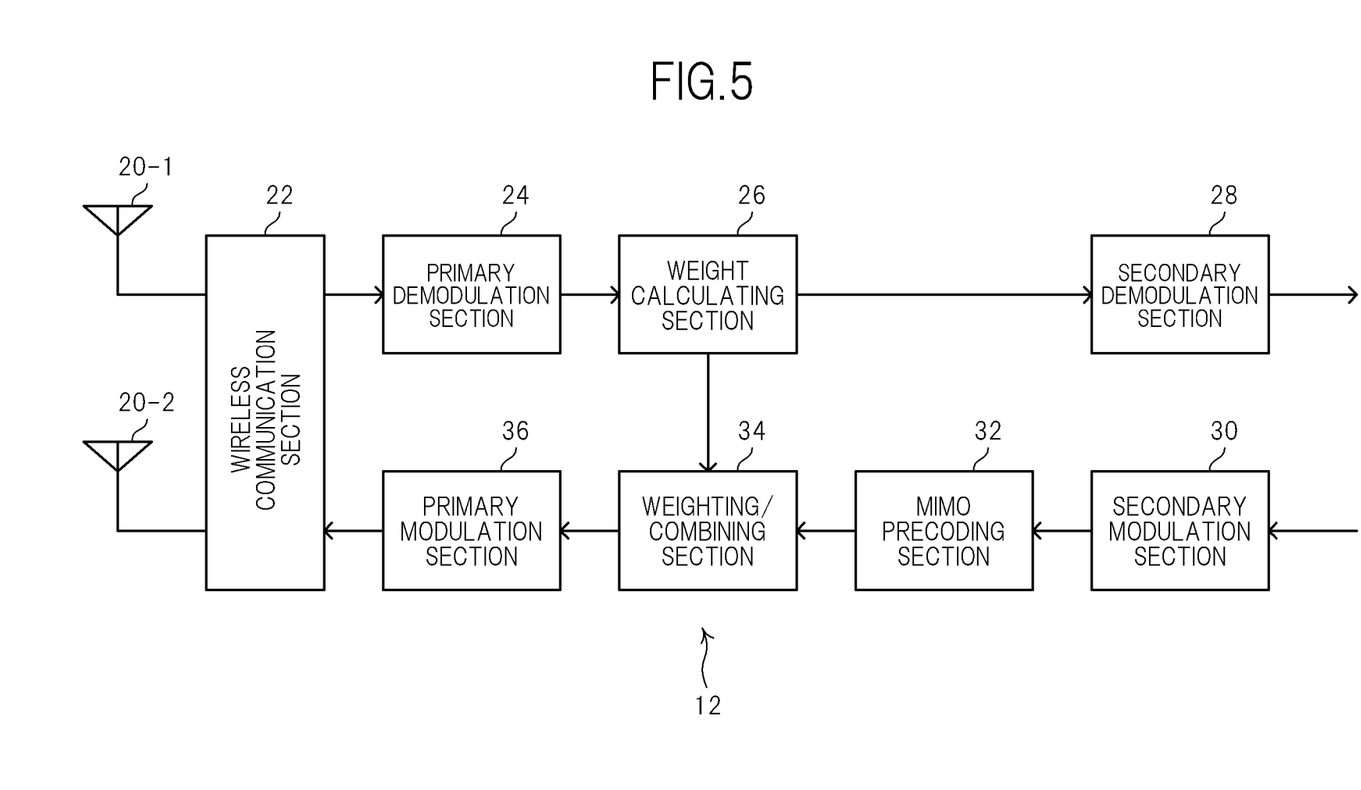
[FIG. 5] A functional block diagram of a base station according to the embodiment.

FIG. 5 is a functional block diagram of the base station 12. As illustrated in FIG. 5, the base station 12 includes a plurality of antennas 20 (in this example, antennas 20-1 and 20-2), a wireless communication section 22, a primary demodulation section 24, a weight calculating section 26, a secondary demodulation section 28, a secondary modulation section 30, a MIMO precoding section 32, a weighting/combining section 34, and a primary modulation section 36.

Figure 6:
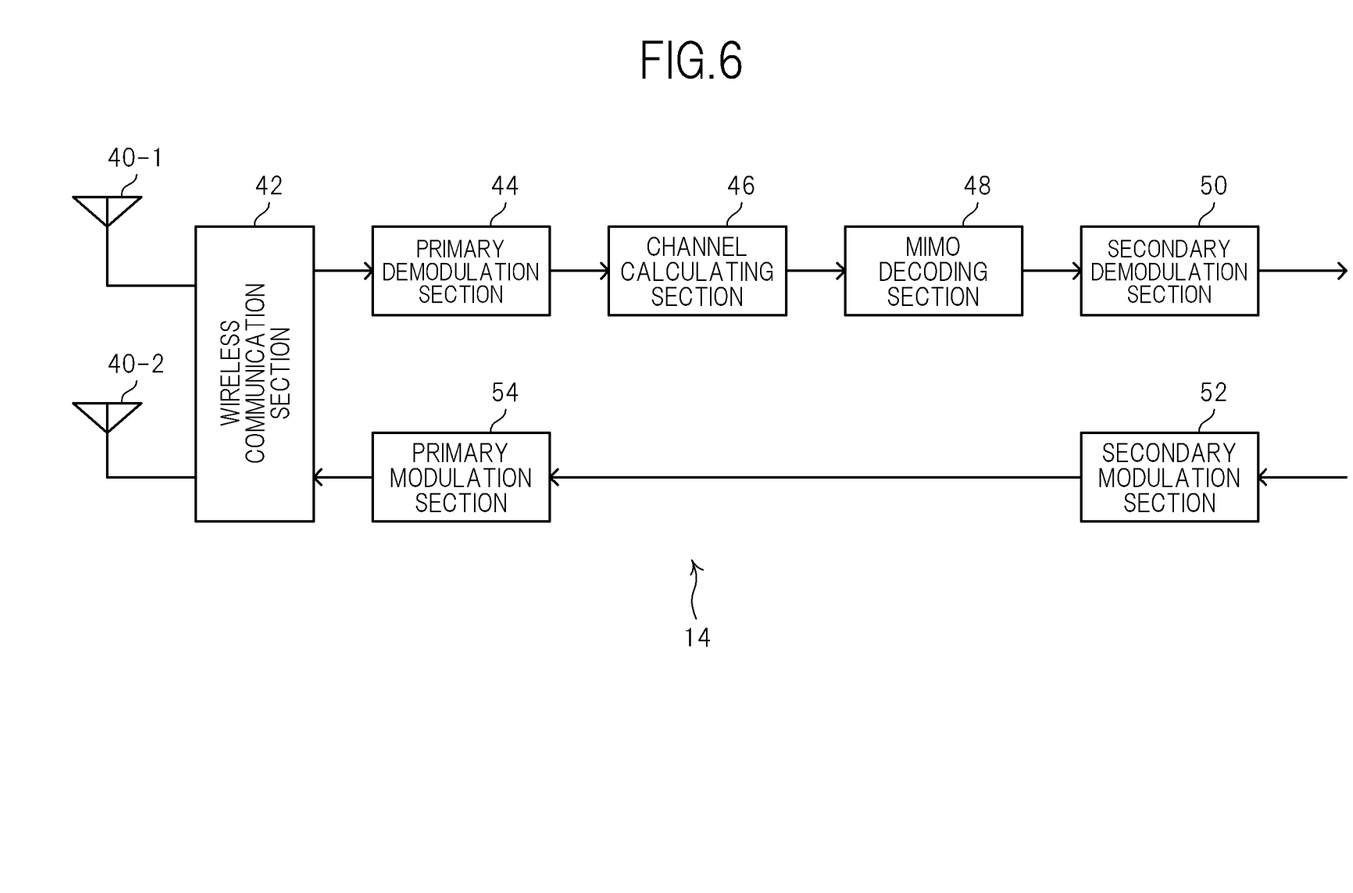
[FIG. 6] A functional block diagram of a mobile station according to the embodiment.

FIG. 6 is a functional block diagram of the mobile station 14. As illustrated in FIG. 6, the mobile station 14 includes a plurality of antennas 40 (in this example, antennas 40-1 and 40-2), a wireless communication section 42, a primary demodulation section 44, a channel calculating section 46, MIMO decoding section 48, a secondary demodulation section 50, a secondary modulation section 52, and a primary modulation section 54.

First, with reference to FIG. 5, the configuration provided to the base station 12 is described.

The antennas 20-1 and 20-2 each receive a radio signal from the mobile station 14, and output the received radio signal to the wireless communication section 22. Further, the antennas 20-1 and 20-2 each transmit a radio signal supplied from the wireless communication section 22 to the mobile station 14.

The wireless communication section 22 includes a low noise amplifier, a power amplifier, a frequency converter, a band-pass filter, an A/D converter, and a D/A converter. The wireless communication section 22 uses the low noise amplifier to amplify the radio signals input from the antennas 20-1 and 20-2, and then down-converts the amplified radio signals to intermediate-frequency signals. The wireless communication section 22 converts the intermediate-frequency signals to digital signals, and then outputs the digital signals to the primary demodulation section 24. Further, the wireless communication section 22 converts digital signals input from the primary modulation section 36 to analog signals, and then up-converts the analog signals to radio signals. The wireless communication section 22 uses the power amplifier to amplify the radio signals up to a transmission output level, and then supplies the resultant signals to the antennas 20-1 and 20-2.

The primary demodulation section 24 includes a fast Fourier transform (FFT) section and a serial-parallel converter. The primary demodulation section 24 performs removal of guard intervals (GI), serial-parallel conversion, discrete Fourier transform, and the like on the digital signal input from the wireless communication section 22. The primary demodulation section 24 combines acquired complex symbols for each PRU, and then outputs a complex symbol sequence combined for each PRU to the weight calculating section 26.

Based on the complex symbol sequence input from the primary demodulation section 24, the weight calculating section 26 calculates transmission weights with respect to each of antennas 40-1 and 40-2 of the mobile station 14 so that the antennas 20-1 and 20-2 could form a directivity pattern directed toward the antennas 40 by using the space division multiplexing. In this embodiment, it is assumed that the mobile station 14 transmits a plurality of (in this example, two kinds of) known reference symbols (training symbols) that have a low correlation therebetween from the antennas 40-1 and 40-2, respectively, at the same frequency and at the same timing, and that the two kinds of reference symbols transmitted from the antennas 40-1 and 40-2 of the mobile station 14 are respectively received by the antennas 20-1 and 20-2 of the base station 12. By doing so, based on the reference symbols that are received by the antennas 20-1 and 20-2 and the two kinds of the known reference symbols, the weight calculating section 26 can calculate reception weights for forming a directivity pattern in which, with respect to each of the antennas 40-1 and 40-2 of the mobile station 14, a main beam is directed toward the antenna 40 in question, and a null is directed toward the other antenna 40 than the antenna 40 in question. For the calculation of the reception weights, for example, such an algorithm as a least mean square (LMS) algorithm or a recursive least squares (RLS) algorithm is used. Then, the weight calculating section 26 multiplies a complex conjugate of the calculated reception weight by a previously-measured calibration vector (calibration information), to thereby acquire the transmission weight.

The secondary demodulation section 28 performs demodulation processing, such as channel estimation, channel equalization, soft bit manipulation, deinterleaving, depuncturing, forward error correction (FEC), descrambling, and cyclic redundancy check (CRC), on the complex symbol sequence obtained through weighted-combining using the complex conjugates of the reception weights. The secondary demodulation section 28 outputs the demodulated reception data to an upper layer (MAC layer) (not shown).

The secondary modulation section 30 performs modulation processing, such as addition of a CRC code, scrambling, convolutional coding, puncturing, interleaving, and constellation mapping, on transmission data addressed to the mobile station 14, which is input from the upper layer (MAC layer).

The secondary modulation section 30 outputs the modulated transmission data (complex symbol sequence) to the MIMO precoding section 32.

The MIMO precoding section 32 performs predetermined MIMO precoding of, for example, the STBC scheme or the SM scheme on the transmission data input from the secondary modulation section 30, to thereby convert the transmission data to a plurality of (in this example, two) data streams respectively corresponding to the antennas 40-1 and 40-2 of the mobile station 14. Then, the MIMO precoding section 32 outputs those two data streams to the weighting/combining section 34.

The weighting/combining section 34 weights each of the two data streams input from the MIMO precoding section 32 with the transmission weight calculated with respect to the corresponding antennas 40 of the mobile station 14 and combines a plurality of weighted data streams for each of the antennas 20, thereby generating a plurality of (in this example, two) combined data streams that are to be supplied respectively to the antennas 20-1 and 20-2. Then, the weighting/combining section 34 outputs the two combined data streams to the primary modulation section 36.

The primary modulation section 36 includes an inverse fast Fourier transform (IFFT) section and a parallel-serial converter. The primary modulation section 36 performs inverse discrete Fourier transform, parallel-serial conversion, addition of GIs, and the like on the combined data stream input from the weighting/combining section 34. The primary modulation section 36 outputs the acquired digital signal to the wireless communication section 22.

Here, more specific description is given of configurations relating to the MIMO precoding and the weighting/combining for cases where the MIMO precoding section 32 performs the MIMO precoding of the STBC scheme and where the MIMO precoding section 32 performs the MIMO precoding of the SM scheme.

Figure 7:
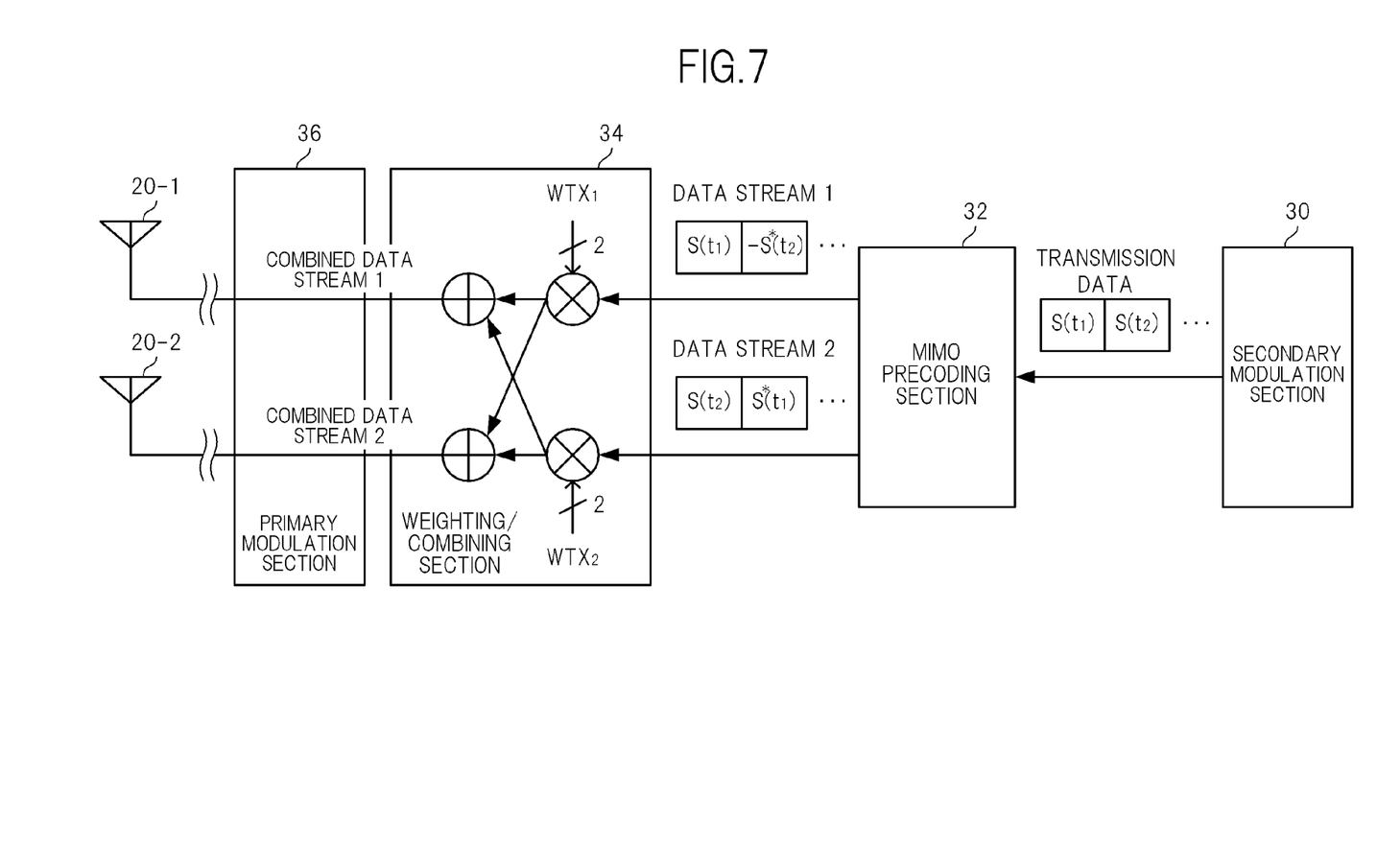
[FIG. 7] A diagram illustrating a configuration relating to MIMO precoding and weighting/combining of an STBC scheme.

FIG. 7 is a diagram illustrating a configuration relating to the MIMO precoding and the weighting/combining of the STBC scheme. As illustrated in the figure, transmission data output from the secondary modulation section 30 is subjected to the MIMO precoding of the STBC scheme by the MIMO precoding section 32, and is converted to two data streams 1 and 2. The data streams 1 and 2 are data streams to be transmitted to the antennas 40-1 and 40-2 of the mobile station 14, respectively.

Here, assuming that S(t) represents the transmission data to be input to the MIMO precoding section 32, and that $X_1(t)$ and $X_2(t)$ represent the data streams 1 and 2 to be output from the MIMO precoding section 32, respectively, $X_1(t)$ and $X_2(t)$ are expressed by the following equation (1).

[Math. 1]

$$\begin{bmatrix} X_1(t_1) & X_1(t_2) \\ X_2(t_1) & X_2(t_2) \end{bmatrix} = \frac{1}{\sqrt{2}} \begin{bmatrix} S(t_1) & -S^*(t_2) \\ S(t_2) & S^*(t_1) \end{bmatrix} \quad (1)$$

Subsequently, the data streams 1 and 2 output from the MIMO precoding section 32 are subjected to the weighting/combining by the weighting/combining section 34. Specifically, the data stream 1 is weighted by a transmission weight $WTX_1$ (transmission weight for forming, by the antennas 20-1 and 20-2, a directivity pattern directed toward the antenna 40-1) that is calculated by the weight calculating section 26 with respect to the antenna 40-1 of the mobile station 14. On the other hand, the data stream 2 is weighted by a transmission weight $WTX_2$ (transmission weight for forming, by the antennas 20-1 and 20-2, a directivity pattern directed toward the antenna 40-2) that is calculated by the weight calculating section 26 with respect to the antenna 40-2 of the mobile station 14. Then, the weighted data streams 1 and 2 are combined for each of the antennas 20, to thereby generate combined data streams 1 and 2 to be supplied to the antennas 20-1 and 20-2, respectively.

The combined data streams 1 and 2 are transmitted from the antennas 20-1 and 20-2, respectively, via the primary modulation section 36. With this configuration, the antenna 40-1 of the mobile station 14 mainly receives the data stream 1, whereas the antenna 40-2 mainly receives the data stream 2.

Figure 8:
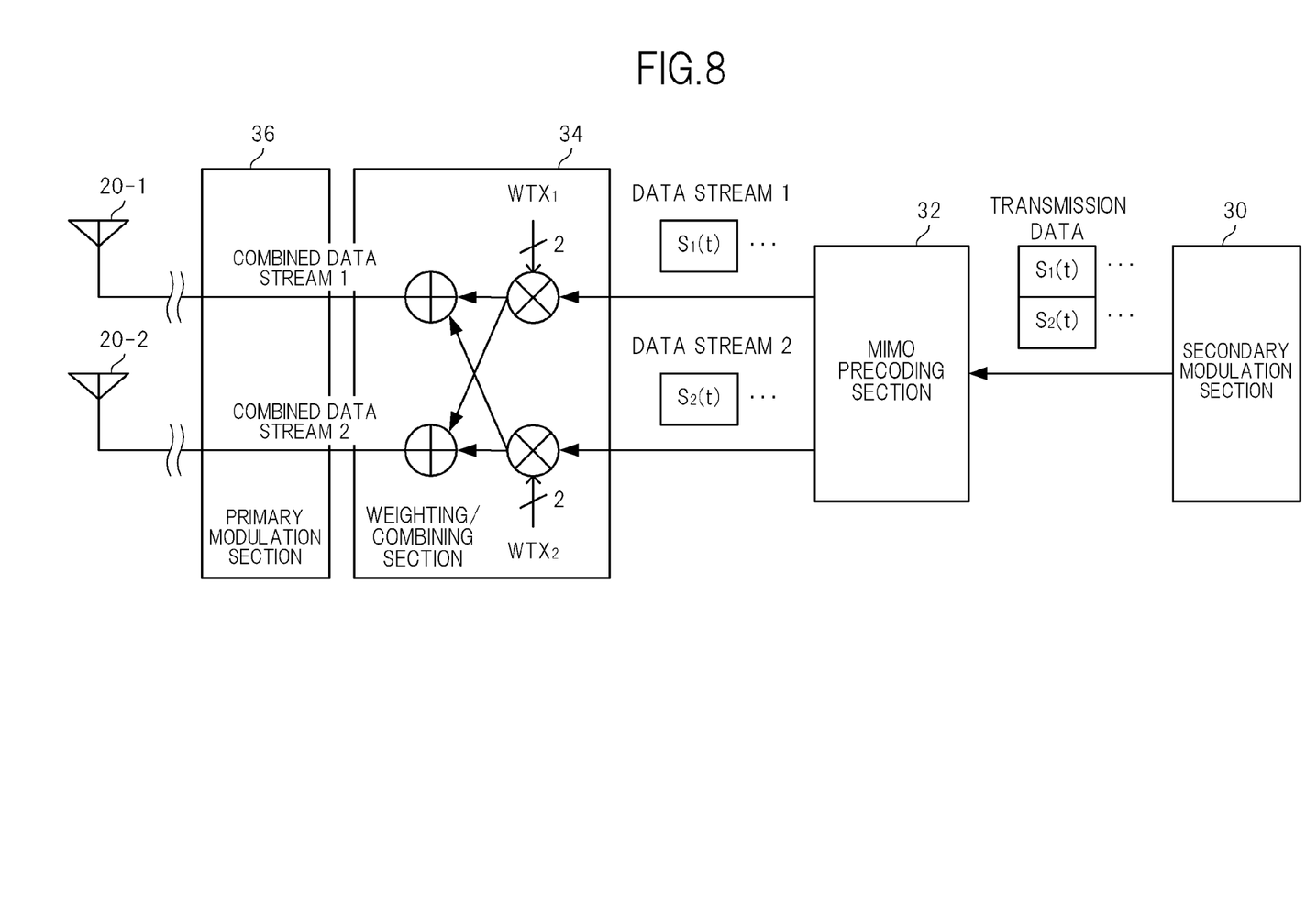
[FIG. 8] A diagram illustrating a configuration relating to MIMO precoding and weighting/combining of an SM scheme.

On the other hand, FIG. 8 is a diagram illustrating a configuration relating to the MIMO precoding and the weighting/combining of the SM scheme. As illustrated in the figure, transmission data output from the secondary modulation section 30 is subjected to the MIMO precoding of the SM scheme by the MIMO precoding section 32, and is converted to two data streams 1 and 2. The data streams 1 and 2 are data streams to be transmitted to the antennas 40-1 and 40-2 of the mobile station 14, respectively.

Here, assuming that $S_1(t)$ and $S_2(t)$ represent the transmission data to be input to the MIMO precoding section 32, and that $X_1(t)$ and $X_2(t)$ represent the data streams 1 and 2 to be output from the MIMO precoding section 32, respectively, $X_1(t)$ and $X_2(t)$ are expressed by the following equation (2).

[Math. 2]

$$\begin{bmatrix} X_1(t) \\ X_2(t) \end{bmatrix} = \frac{1}{\sqrt{2}} \begin{bmatrix} S_1(t) \\ S_2(t) \end{bmatrix} \quad (2)$$

Note that, processing performed downstream of the MIMO precoding section 32 is the same as that of the above-mentioned STBC scheme, and hence description thereof is herein omitted.

Next, referring to FIG. 6, the configuration provided to the mobile station 14 is described.

The antennas 40-1 and 40-2 each receive a radio signal from the base station 12, and then outputs the received radio signal to the wireless communication section 42. Further, the antennas 40-1 and 40-2 each transmit a radio signal supplied from the wireless communication section 42 to the base station 12.

The wireless communication section 42 includes a low noise amplifier, a power amplifier, a frequency converter, a band-pass filter, an A/D converter, and a D/A converter. The wireless communication section 42 uses the low noise amplifier to amplify the radio signals input from the antennas 40-1 and 40-2, and then down-converts the amplified radio signals to intermediate-frequency signals. The wireless communication section 42 converts the intermediate-frequency signals to digital signals, and then outputs the digital signals to the primary demodulation section 44. Further, the wireless communication section 42 converts digital signals input from the primary modulation section 54 to analog signals, and then up-converts the analog signals to radio signals. The wireless communication section 42 uses the power amplifier to amplify the radio signals up to a transmission output level, and then supplies the resultant signals to the antennas 40-1 and 40-2.

The primary demodulation section 44 includes a FFT section and a serial-parallel converter. The primary demodulation section 44 performs removal of GIs, serial-parallel conversion, discrete Fourier transform, and the like on the digital signal input from the wireless communication section 42. The primary demodulation section 44 combines acquired complex symbols for each subchannel, and then outputs a complex symbol sequence combined for each subchannel to the channel calculating section 46.

Based on the complex symbol sequence input from the primary demodulation section 44, the channel calculating section 46 estimates a characteristic of the radio propagation path (each PRU allocated to the mobile station 14 by the base station 12) that exists between the base station 12 and the mobile station 14. In this embodiment, it is assumed that the base station 12 transmits a data stream that contains a known control symbol (pilot symbol) via respective PRUs allocated to the mobile station 14. By doing so, based on combined data streams that are received by the antennas 40-1 and 40-2 and the known control symbol, the channel calculating section 46 can estimate the characteristic of the radio propagation path that exists between the base station 12 and the mobile station 14.

For example, it is assumed that $X_1(t)$ and $X_2(t)$ represent radio signals to be transmitted from the antennas 20-1 and 20-2 of the base station 12, respectively, and that $Y_1(t)$ and $Y_2(t)$ represent radio signals to be received by the antennas 40-1 and 40-2 of the mobile station 14. In this case, a propagation path matrix H (the left index of each element indicates the antenna 40 of the mobile station 14, whereas the right index thereof indicates the antenna 20 of the base station) indicating the characteristic of the radio propagation path that exists between the base station 12 and the mobile station 14 is expressed by the following equation (3).

[Math. 3]

$$\begin{bmatrix} Y_1(t) \\ Y_2(t) \end{bmatrix} = \begin{bmatrix} H_{11}(t) & H_{12}(t) \\ H_{21}(t) & H_{22}(t) \end{bmatrix} \begin{bmatrix} X_1(t) \\ X_2(t) \end{bmatrix} \quad (3)$$

Figure 9:
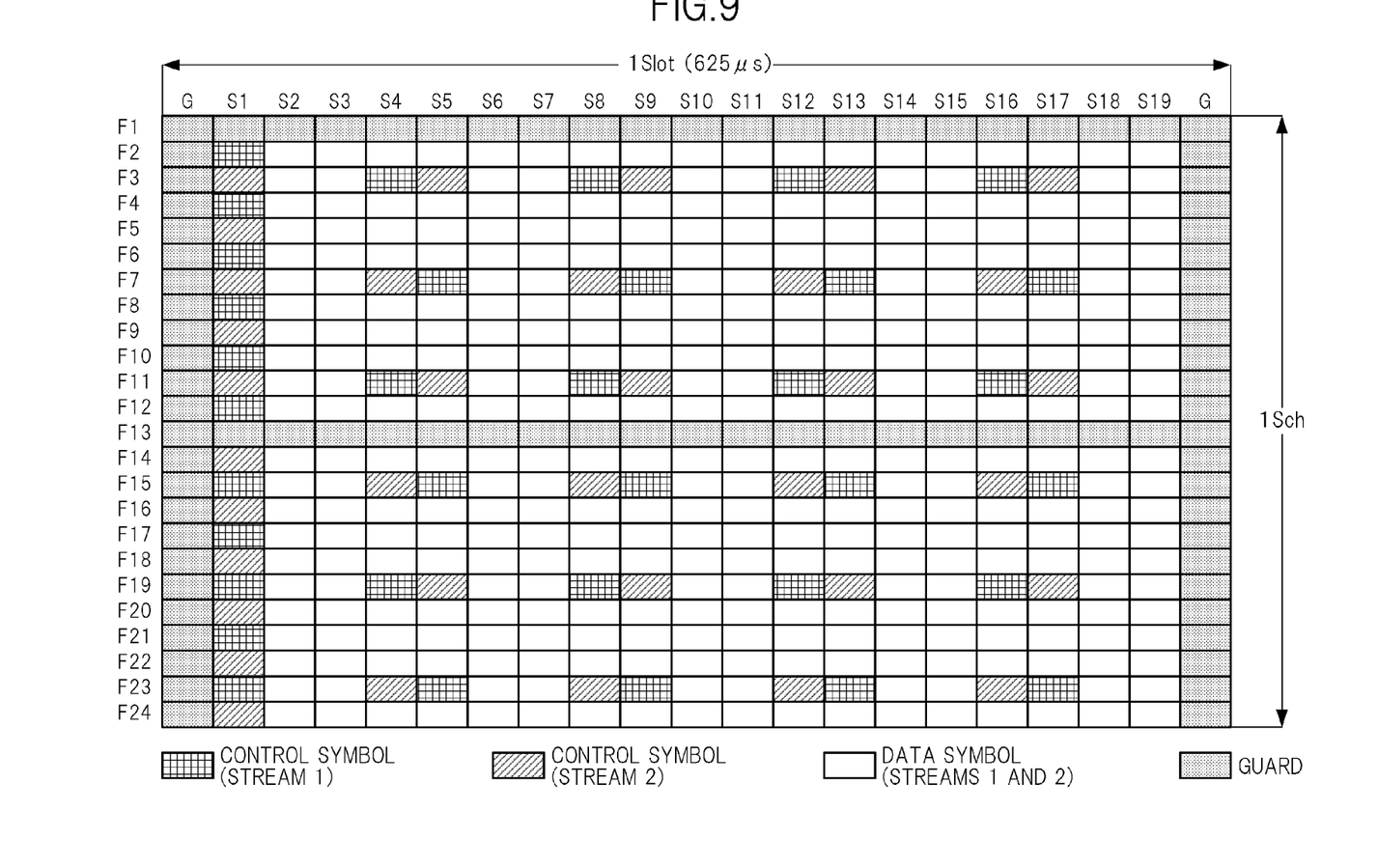
[FIG. 9] A diagram illustrating an example of detailed structure of a PRU according to the embodiment.

Here, in order to determine the propagation path matrix H accurately, it is desired that the data stream be generated in such a manner that the known control symbols are disposed across the PRUs as evenly as possible. FIG. 9 is a diagram illustrating an example of detailed structure of the PRU when one time slot has a time duration corresponding to 21 symbols (including guard time) and one subchannel is constituted of 24 subcarriers (including guard bands). For example, as illustrated in FIG. 9, a plurality of control symbols may be disposed in a distributed manner among data symbols addressed to the mobile station 14 so that the control symbols are contained extensively in the data stream 1 that is to be received mainly by the antenna 40-1 and in the data stream 2 that is to be received mainly by the antenna 40-2.

The MIMO decoding section 48 performs the MIMO decoding, which corresponds to the MIMO precoding performed by the base station 12, on the combined data streams received by the antennas 40-1 and 40-2, to thereby acquire the transmission data addressed to the mobile station 14 as reception data. The MIMO decoding section 48 outputs the reception data to the secondary demodulation section 50.

For example, in the case where the base station 12 performs the MIMO precoding of the STBC scheme, the relation of the following equation (4), which is derived from the equations (1) and (3), is established between the radio signals $Y_1(t)$ and $Y_2(t)$ to be respectively received by the antennas 40-1 and 40-2 and pieces of transmission data $S_1(t)$ and $S_2(t)$ addressed to the mobile station 14. Accordingly, the MIMO decoding section 48 can acquire transmission data from the base station 12 as the reception data by substituting the propagation path matrix H determined by the channel calculating section 46 into the equation (4).

[Math. 4]

$$\begin{bmatrix} S(t_1) \\ S(t_2) \end{bmatrix} = \frac{1}{\sum_{j=1}^{2}(H_{j1}(t_1)H_{j1}^*(t_2) + H_{j2}(t_1)H_{j2}^*(t_2))} \quad (4)$$

$$\sum_{j=1}^{2}\left(\begin{bmatrix} H_{j1}^*(t_1) & H_{j2}(t_2) \\ H_{j2}^*(t_2) & -H_{j1}(t_1) \end{bmatrix}\begin{bmatrix} Y_j(t_1) \\ Y_j^*(t_2) \end{bmatrix}\right)$$

On the other hand, in the case where the base station 12 performs the MIMO precoding of the SM scheme, the relation of the following equation (5), which is derived from the equations (2) and (3) (in this example, by applying zero forcing (ZF) algorithm), is established between the radio signals $Y_1(t)$ and $Y_2(t)$ to be respectively received by the antennas 40-1 and 40-2 and pieces of transmission data $S_1(t)$ and $S_2(t)$ addressed to the mobile station 14. Accordingly, the MIMO decoding section 48 can acquire the transmission data from the base station 12 by substituting the propagation path matrix H determined by the channel calculating section 46 into the equation (5).

[Math. 5]

$$\begin{bmatrix} S_1(t) \\ S_2(t) \end{bmatrix} = \begin{bmatrix} H_{11}(t) & H_{12}(t) \\ H_{21}(t) & H_{22}(t) \end{bmatrix}^{-1} \begin{bmatrix} Y_1(t) \\ Y_2(t) \end{bmatrix} \quad (5)$$

The secondary demodulation section 50 performs the demodulation processing, such as soft bit manipulation, deinterleaving, depuncturing, FEC, and CRC, on the reception data input from the MIMO decoding section 48. The secondary demodulation section 50 outputs the demodulated reception data to the upper layer (MAC layer) (not shown).

The secondary modulation section 52 performs the modulation processing, such as addition of a CRC code, scrambling, convolutional coding, puncturing, interleaving, constellation mapping, and symbol mapping, on transmission data addressed to the base station 12, which is input from the upper layer (MAC layer). The secondary modulation section 52 outputs the modulated transmission data (complex symbol sequence) to the primary modulation section 54.

The primary modulation section 54 includes an IFFT section and a parallel-serial converter. The primary modulation section 54 performs inverse discrete Fourier transform, parallel-serial conversion, addition of GIs, and the like on the modulated transmission data input from the secondary modulation section 52. The primary modulation section 54 outputs the acquired digital signal to the wireless communication section 42.

Next, the operation of the base station 12 and the mobile station 14 is described.

Figure 10:
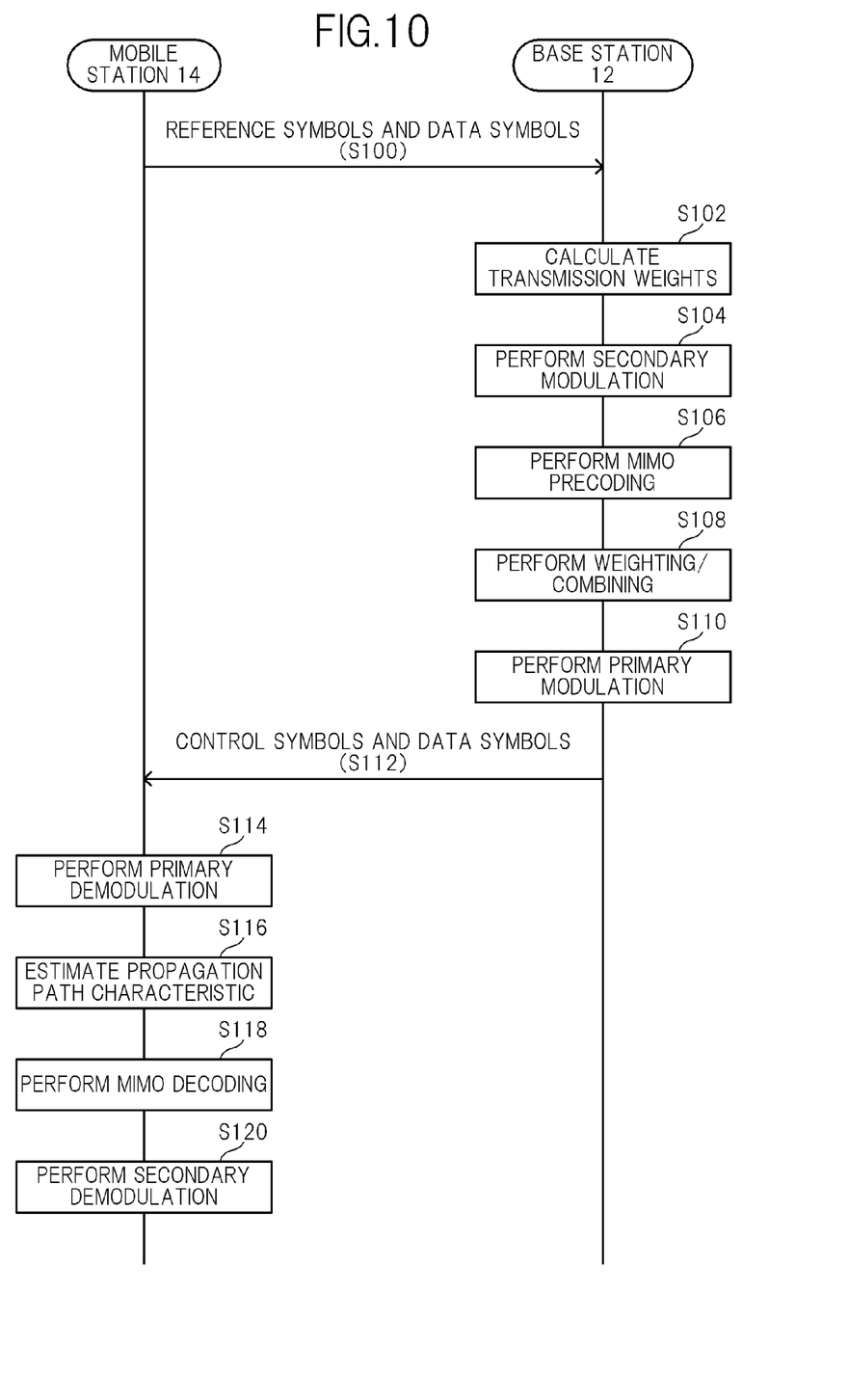
[FIG. 10] A sequence diagram illustrating an example of a wireless communication method according to the embodiment.

FIG. 10 is a sequence diagram illustrating an example of a wireless communication method performed in the wireless communication system 10. Here, description is given mainly of data transmission processing that is performed in units of one slot or in units of a plurality of slots from the base station 12 to the mobile station 14.

As illustrated in FIG. 10, the mobile station 14 transmits two kinds of known reference symbols (for weight calculation) that have a low correlation therebetween from the antennas 40-1 and 40-2, respectively, along with data symbols at the same frequency and at the same timing (S100). On the other hand, the base station 12 receives the two kinds of reference symbols respectively transmitted from the antennas 40-1 and 40-2 of the mobile station 14 with the antennas 20-1 and 20-2.

Subsequently, based on the reference symbols that are received by the antennas 20-1 and 20-2 and the two kinds of the known reference symbols, the base station 12 calculates transmission weights with respect to each of the antennas 40-1 and 40-2 of the mobile station 14 so as to form a directivity pattern directed toward the antenna 40 by using the space division multiplexing (S102).

Subsequently, the base station 12 performs secondary modulation processing on transmission data addressed to the mobile station 14 (S104), and converts the transmission data to two data streams respectively corresponding to the antennas 40-1 and 40-2 of the mobile station 14 by performing the MIMO precoding on the modulated transmission data (S106). The data stream contains known control symbols (for estimation of propagation path characteristic) as well as data symbols. After that, the base station 12 weights each of the two data streams with the transmission weight calculated with respect to the antennas 40 of the mobile station 14 which corresponds to the data stream, and combines the two weighted data streams for each of the antennas 20, thereby generating two combined data streams that are to be supplied respectively to the antennas 20-1 and 20-2 (S108).

Then, the base station 12 performs primary modulation processing such as inverse discrete Fourier transform on the two combined data streams (S110), and respectively transmits the two combined data streams containing control symbols and data symbols from the antennas 20-1 and 20-2 (S112). On the other hand, the mobile station 14 receives the two combined data streams respectively transmitted from the antennas 20-1 and 20-2 of the base station 12 with the antennas 40-1 and 40-2. In actuality, owing to a beamforming effect obtained through weighting/combining processing of S108, one of the two data streams is received mainly by the antenna 40-1, whereas the other thereof is received mainly by the antenna 40-2.

Subsequently, the mobile station 14 performs primary demodulation processing such as discrete Fourier transform on the combined data streams received by the antennas 40-1 and 40-2 (S114). Further, based on the combined data streams received by the antennas 40-1 and 40-2 and the known control symbols, the mobile station 14 estimates the characteristic of the radio propagation path (each PRU allocated to the mobile station 14 by the base station 12) that exists between the base station 12 and the mobile station 14 (S116). After that, based on the estimated characteristic of the radio propagation path, the mobile station 14 performs the MIMO decoding on the combined data streams received by the antennas 40-1 and 40-2, to thereby acquire the transmission data addressed to the mobile station 14 as the reception data (S118). Then, the mobile station 14 performs secondary demodulation processing on the reception data subjected to the MIMO decoding (S120).

According to the wireless communication system 10 described above, when there is little fluctuation in the radio propagation path that exists between the base station 12 and the mobile station 14, it is easy to obtain the beamforming gain due to the directivity pattern formed by the base station 12. The beamforming gain exceeds the MIMO reception combined gain that is obtained through the conventional MIMO scheme in which the transmission is non-directional. On the other hand, when there is large fluctuation in the radio propagation path, it is difficult to obtain the beamforming gain due to the distortion of the directivity pattern, but, instead, the MIMO reception combined gain that equals to that of the conventional MIMO scheme can be obtained. Therefore, as illustrated in FIG. 4, particularly when there is little fluctuation in the radio propagation path that exists between the base station 12 and the mobile station 14, it is possible to enhance the MIMO reception characteristic in the mobile station 14.

Note that, the present invention is not limited to the above-mentioned embodiment.

For example, in the above-mentioned embodiment, there has been given an example in which the base station 12 serves as the transmission device whereas the mobile station 14 serves as the MIMO reception device. However, the mobile station 14 may serve as the transmission device whereas the base station 12 may serve as the MIMO reception device. Further, at least one of the number of antennas of the base station 12 and the number of antennas of the mobile station 14 may be set to three or larger.

Further, the interval of the antennas on the transmission device side may be set wider than the interval of the antennas on the MIMO reception device side. With this configuration, the antenna correlation on the transmission device side becomes lower than the antenna correlation on the MIMO reception device side, and hence the beamforming effect becomes more likely to be provided, resulting in further enhancement in the MIMO reception characteristic.

Further, the present invention is not limited to the STBC-MIMO scheme or the SM-MIMO scheme, and may be applied to any wireless communication system that adopts the MIMO scheme in which the MIMO precoding is performed on the transmission data.

The invention claimed is:

1. A transmission device comprising:
   a plurality of transmission antennas;
   weight calculating means for calculating a transmission weight with respect to each of a plurality of reception antennas of a reception device so that the plurality of transmission antennas form a directivity pattern directed toward the each of the plurality of reception antennas; and
   receiving means for receiving, by the plurality of transmission antennas, a plurality of known reference symbols having a low correlation thereamong transmitted from the plurality of reception antennas at the same frequency and at the same timing,
   wherein the weight calculating means calculates, based on the plurality of known reference symbols received by the plurality of transmission antennas, the transmission weight for forming the directivity pattern in which, with respect to the each of the plurality of reception antennas of the reception device, each of a plurality of main streams is directed toward a corresponding each of the plurality of reception antennas of the reception device and a null is directed toward a reception antenna other than the each of the plurality of reception antennas of the reception device.

2. The transmission device according to claim 1, further comprising:
   transmitting means for generating a plurality of combined data streams by weighting each of a plurality of data streams that corresponds to the each of the plurality of reception antennas with the transmission weight calculated and combining the plurality of weighted data streams for each of the plurality of transmission antennas, and respectively transmitting the plurality of combined data streams from the plurality of transmission antennas.

3. A wireless communication method for a transmission device which includes:

a plurality of transmission antennas;

weight calculating means for calculating a transmission weight with respect to each of a plurality of reception antennas of a reception device so that the plurality of transmission antennas form a directivity pattern directed toward the each of the plurality of reception antennas of the reception device; and receiving means for receiving, by the plurality of transmission antennas, a plurality of known reference symbols having a low correlation thereamong transmitted from the plurality of reception antennas at the same frequency and at the same timing, the wireless communication method comprising:

directing, with respect to the each of the plurality of reception antennas, each of a plurality of main streams toward a corresponding each of the plurality of reception antennas of the reception device based on the plurality of known reference symbols received by the plurality of transmission antennas of the reception device; and calculating a transmission weight for forming the directivity pattern in which, a null is directed toward a reception antenna other than the each of the plurality of reception antennas of the reception device.

* * * * *